United States Patent
Synnestvedt et al.

(10) Patent No.: US 7,284,058 B1
(45) Date of Patent: Oct. 16, 2007

(54) QUERYING ASAP POLICY SYSTEMS

(75) Inventors: Robert Glenn Synnestvedt, Palo Alto, CA (US); Vasudeva Ramachandra, Morrisville, NC (US); Charles U. Eckel, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 545 days.

(21) Appl. No.: 10/286,287

(22) Filed: Nov. 1, 2002

(51) Int. Cl.
*G06F 15/16* (2006.01)

(52) U.S. Cl. ............... 709/227; 709/203; 709/206; 709/217; 709/218; 709/219; 713/168; 713/169; 713/170

(58) Field of Classification Search ........... 709/202, 709/203, 206, 217, 218, 219, 227–228; 710/39, 710/240; 713/201; 370/468, 352, 356
See application file for complete search history.

(56) References Cited

U.S. PATENT DOCUMENTS

| | | | |
|---|---|---|---|
| 6,141,759 A * | 10/2000 | Braddy | 713/201 |
| 6,363,065 B1 * | 3/2002 | Thornton et al. | 370/352 |
| 6,584,529 B1 * | 6/2003 | Thomas | 710/240 |
| 6,654,366 B1 * | 11/2003 | Ketcham | 370/352 |
| 6,798,786 B1 * | 9/2004 | Lo et al. | 370/468 |
| 6,909,711 B1 * | 6/2005 | Noguchi | 370/356 |
| 2002/0041590 A1 * | 4/2002 | Donovan | 370/352 |

OTHER PUBLICATIONS

ITU-T (Telecommunication Standardization Sector of ITU) Recommendation H.323, Series H: *Audiovisual and Multimedia Systems, Infrastructure of audiovisual services—systems and terminal equipment for audiovisual services*, "Packet-based multimedia communication systems," (Sep. 1999) (129 pages).
IETF (The Internet Engineering Task Force) Network Working Group, Request for Comments: 2543, Category: Standards Track, "SIP: Session Initiation Protocol," (143 pages); http://www.ietf.org/rfc/rfc2543.txt.

* cited by examiner

*Primary Examiner*—Yves Dalencourt
(74) *Attorney, Agent, or Firm*—Marger Johnson & McCollom, P.C.

(57) ABSTRACT

A method for querying any-service-any-port policy systems includes a method for a network device to route calls using policy considerations. The method receives a call request associated with a call and queries a policy system to determine if the network can accept the call. A message is then generated that includes a response to the request.

20 Claims, 2 Drawing Sheets

Figure 2
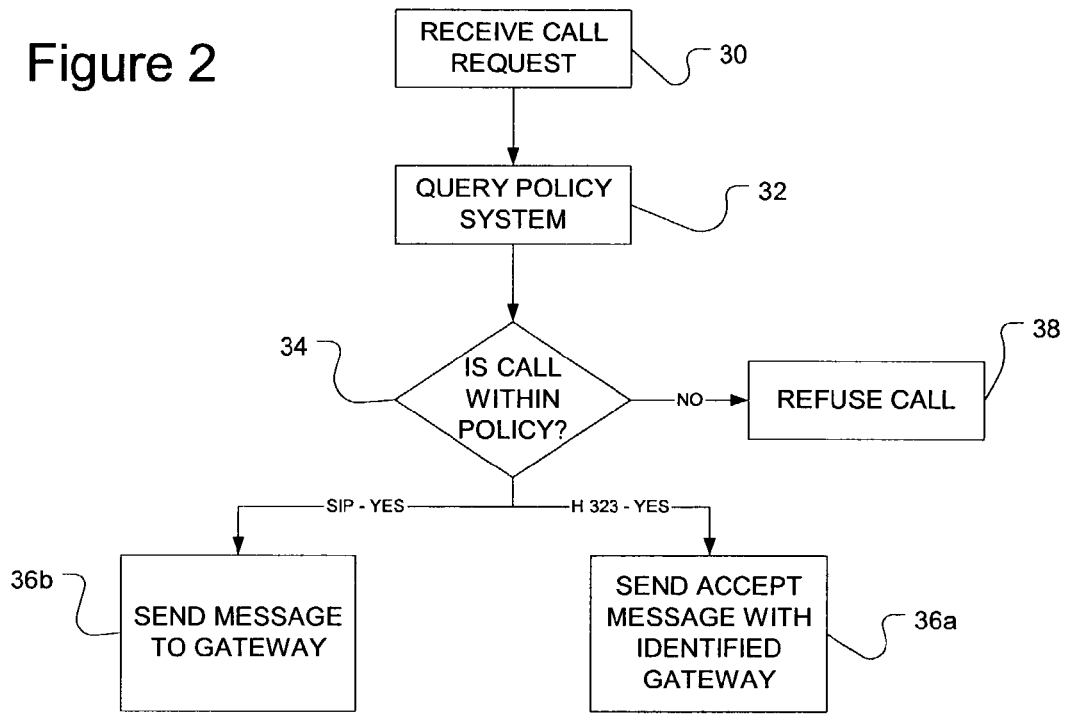
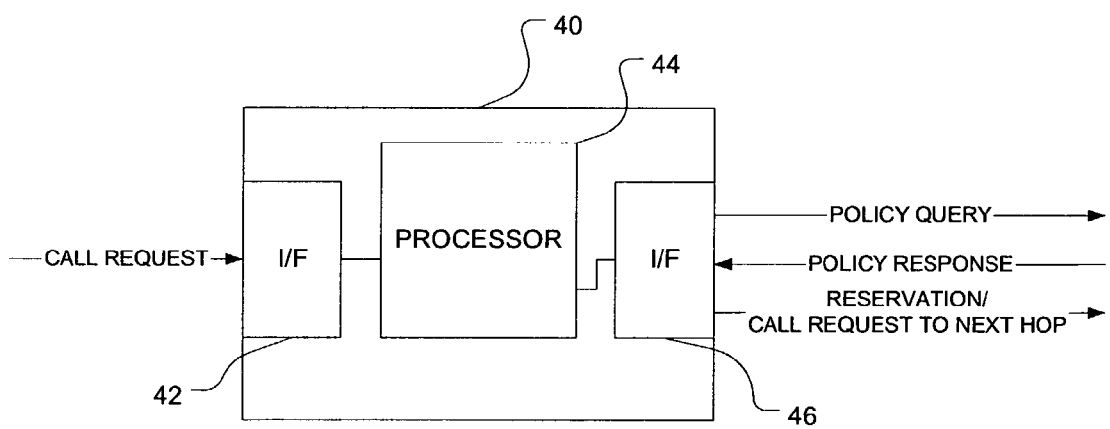
Figure 3

QUERYING ASAP POLICY SYSTEMS

BACKGROUND

1. Field

This disclosure relates to any service any port (ASAP), more particularly to managing call routing in accordance with policy on ASAP systems.

2. Background

Network wholesalers may manage their various policies on their network in a policy system. The policies may include port policies, such as the number of active ports allowed for a particular point-of-presence (POP), the number of active users associated with a particular customer allowed under a service level agreement with that customer, as well as the levels of service provided for a particular customer.

For example, a wholesaler may have an agreement with an Internet Service Provider (ISP) that guarantees a certain quality of service for that ISP for 10,000 active calls on a particular set of POPs for the wholesalers network, with a best effort overage of 3,000 calls. The policy system would maintain the current state of the network and would determine how many calls are associated with that ISP and would accept or reject calls from users associated with the ISP based upon the state of the network. Included in the 'dial' calls may be Voice over Internet Protocol (VoIP) calls.

VoIP calls impact the various policies and the pool of resources that could also be used for dial calls. Typically, universal gateways, which provide entrance to the network, are provisioned to issue pre-authentication messages prior to accepting a call, allowing policy decisions to impact which calls are accepted. However, most VoIP networks are provisioned to adjust call routing based upon available hardware resources, not on ASAP policies. An originating network may have several choices to route the call to various terminating networks, and may do so using least-cost call routing, without any policy influences.

This mismatch between routing decisions and acceptance decisions may lead to an endless loop. As such, terminating networks may prematurely accept an originating network's call accept request, then later reject that call accept request after a gateway resource was committed to accept another call in the meantime. This is known as 'glare' and can lead to circular routing decisions.

For example, the originating network routes the call to the terminating network as it sees the terminating network as the least-cost option. Today's networks may not link policy control to terminating network call control. The terminating network has a policy constraint that causes it to reject the call. The originating network, not basing decisions on policy, continues to route the call to that terminating gateway, which continues to reject the call.

SUMMARY

One embodiment of the invention is a method for routing calls based upon policy. The method includes receiving a call request associated with a call and querying a policy system to determine if the call can be accepted. If the call can be accepted, a message accepting the call is transmitted, where the message may include the address of a gateway upon which the call is to be terminated. If the call cannot be accepted, the message rejects the call.

Another embodiment of the invention is a network device that receives a call request and queries a policy system to determine if the call associated with the call request can be accepted. In one embodiment the network device is a SIP proxy server or other SIP control device. In another embodiment the network device is a H.323 gatekeeper.

BRIEF DESCRIPTION OF THE DRAWINGS

The invention may be best understood by reading the disclosure with reference to the drawings, wherein:

FIG. 2 shows a flowchart of an embodiment of a method to query a policy system.

FIG. 3 shows an embodiment of a network device capable of querying a policy system.

DETAILED DESCRIPTION OF THE EMBODIMENTS

Figure 1:
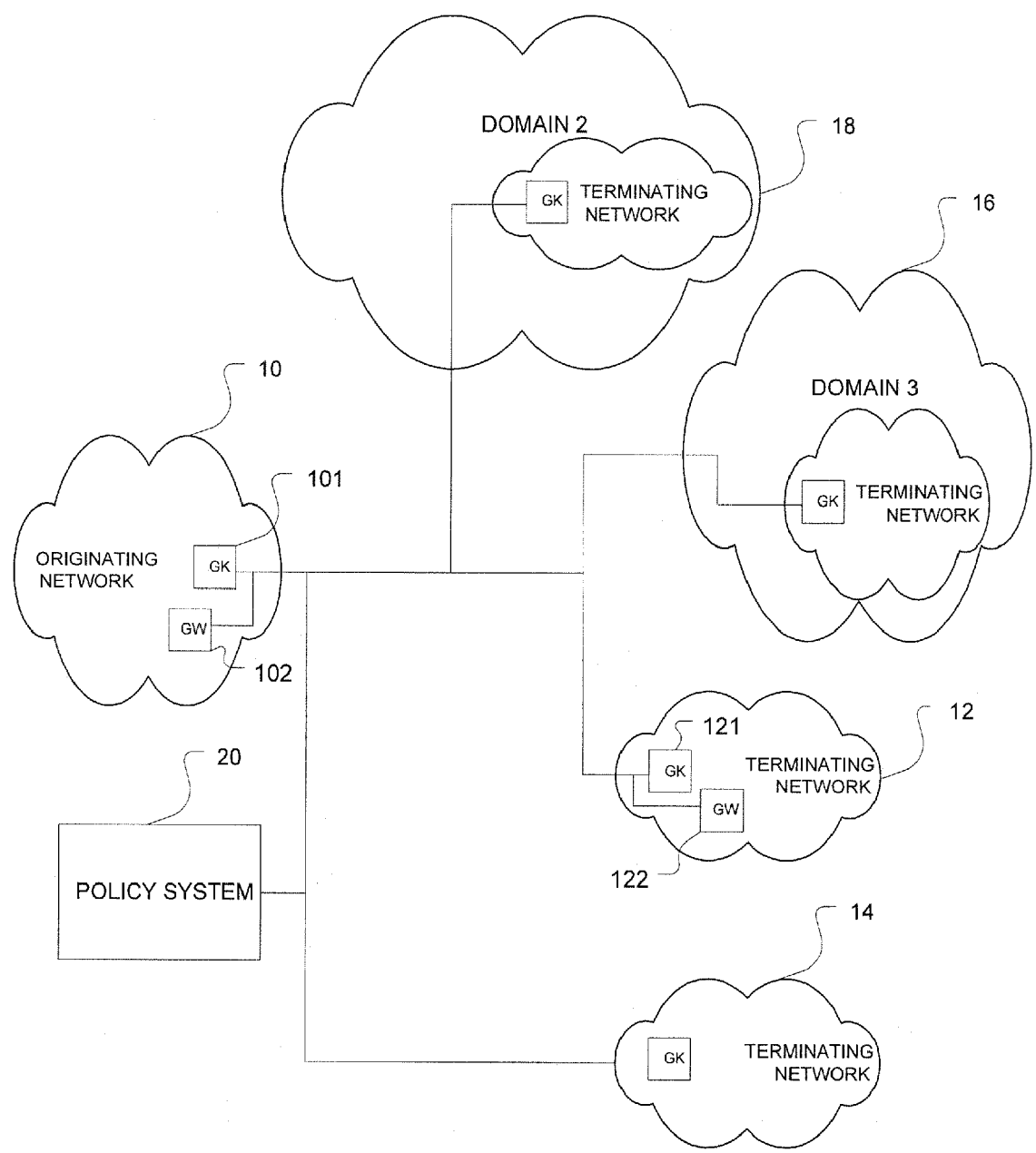
FIG. 1 shows a call route from an originating network to a terminating network that involves a policy system.

FIG. 1 shows a network diagram of an originating network and a terminating network governed by a policy system. The originating network and the terminating network may have different policy systems, but the focus of this discussion will be on the terminating network and its interaction with the policy system governing the terminating network. A customer may use a network that has different segments of it governed by different wholesalers. For example, the originating network 10 may belong to Wholesaler 1, and terminating networks 12 and 14 may belong to Wholesaler 2 in Domain 1. Wholesalers 3 and 4 may own terminating networks 16 and 18, respectively.

An originating gatekeeper 101 and the terminating gatekeepers may be gatekeepers in compliance with the International Telecommunications Union (ITU) recommendation H.323 "Packet-based Multimedia Communications Systems," or a session initiation protocol (SIP) proxy, as examples. For ease of discussion, both of these will be referred to as gatekeepers. Gatekeepers that are in compliance with H.323 will be specifically referred to as H.323 gatekeepers, to avoid confusion with the broader use of the term gatekeeper. As mentioned previously, the gatekeepers will identify available gateways to terminate the call. Currently, this identification process will not include considerations of policy close enough to the origination point to avoid routing loops, or, in the case of SIP, optimize the selection of a terminating network.

In order to understand the nature of a routing loop, it is helpful to provide an example scenario. The example network diagram of FIG. 1 is only intended to provide an environment in which the invention can be understood and is not intended to limit the scope of the invention in any way. In the below examples, originating network 10 has a gatekeeper 101 that seeks the lowest cost terminating network. Terminating network 12 will be assumed to be the lowest cost terminating network, followed by terminating network 16. As mentioned previously, different wholesalers own these terminating networks.

In the current environment, a routing loop may occur because policy queries, if any are made, are typically made by the terminating network gateways. A call comes into Wholesaler 1's network. The Wholesaler 1 gatekeeper 101 sends a request to the lowest cost option for routing, in this case terminating network 12, owned by Wholesaler 2. The terminating network gatekeeper 121 accepts the request, as it has enough capacity to handle the call. Upon receipt of the acceptance, which includes the address of a terminating gateway, Wholesaler 1's gatekeeper 101 then hands call control over to Wholesaler 1's gateway 102. This originating gateway 102 then sends the call request to terminating gateway 122 on the terminating network 12.

However, the terminating gateway 122 belongs to Wholesaler 2 and is governed by the policy system 20. The terminating gateway 122 then queries the policy system and determines that, while it may have the capacity to handle the call, the call is outside a policy for the system. The policy may be a service level agreement between Wholesaler 1 and Wholesaler 2, or a service level agreement between Wholesaler 2 and the Internet Service Provider with whom that call is associated, as examples. As a result of the call being outside the policy, the terminating gateway 122 rejects the call request.

Upon rejection, the originating gateway 102 receives the rejection and returns call control back to the originating gatekeeper 101. The originating gatekeeper 101, making queries and decisions based strictly upon least-cost routing and capacity, routes the call back to the gatekeeper 121 at terminating network 12. The gatekeeper 121 again checks to see if it has capacity and accepts the call, as there is no policy query at this point. The process then repeats itself until the caller gives up, or the parameters of traffic governed by the policy system 20 changes and the call becomes within policy, as examples.

As mentioned above, the terminating gatekeepers and/or the originating gatekeepers may be SIP proxy or H.323 gatekeepers. In these types of networks, there is a two-stage call setup request. The first stage is from SIP proxy to SIP proxy, or from gatekeeper to gatekeeper. The second stage is from gateway to gateway for H.323 and from SIP proxy to gateway. If the terminating network waits until the call setup is to the second stage, at the gateway level, and the policy system rejects the call, the rejection status is not propagated back to the original gatekeeper for H.323. In SIP, the rejection is propagated back to the SIP proxy, but implementation of the invention will optimize the selection.

Implementation of embodiments of this invention results in a look ahead process that prevents a routing loop in the H.323 systems and allows for better optimization of SIP systems. The bandwidth and time taken to perform the gateway-to-gateway negotiation is eliminated for calls that are to be rejected by the terminating network due to policy restrictions.

SIP proxies typically use RADIUS (Remote Authentication Dial-In User Service) requests to perform the authentication of the call party and for billing and accounting processes. RADIUS has a pre-defined set of attributes and a set of vendor-defined attribute, called VSAs (Vendor Specific Attributes). A standard RADIUS attribute Service Type, is used to distinguish authentication requests from pre-authentication requests. A Cisco® VSA, Attribute [26.9.1] Resource Type, is used to distinguish pre-authentication reservation requests from pre-authentication query requests. The policy query access request would cause the policy system to determine if the call is 'within policy' and can be granted. As used here, the phrase 'within policy' means that the call does not cause the system to violate any of the relevant policy constraints, such as Service Level Agreements (SLA), port policies, etc.

In this manner, the SIP proxy will be able to take into account policies prior to routing calls. This allows the system to reject calls closer to the origination point and avoids routing inefficiencies discussed previously. The SIP proxy may accept the call if the query is accepted, rejecting the call if the query is rejected.

Typically, an H.323 gatekeeper will rely upon some messaging protocol to send a message to the policy system. In some Cisco® gatekeepers, a Cisco proprietary protocol may be used. The protocol is Gatekeeper Transaction Message Protocol (GKTMP). For example, an H.323 gatekeeper, wishing to query a policy system, may send a Request ARQ, which is a Cisco GKTMP message as a trigger to ARQ, a request to initiate a call from the H.323 gateway.

The terminating gatekeeper queries the policy system and informs the policy system of the terminating gateway chosen to terminate the call. If the call is not within policy constraints for that gateway, the policy system will respond and the terminating gatekeeper will reject the call or will find a gateway for which the call is within policy or a gateway that is not governed by the policy system.

A possible variation that may occur with H.323 gatekeepers occurs when the originating gatekeeper broadcasts a location request (LRQ), a query looking for the least cost call termination. These are generally performed between gatekeepers of different domains. The problem that could arise is that several terminating gatekeepers may respond with a reservation, resulting in multiple reservations for one call request. Therefore, it is advantageous to have the terminating gatekeepers perform the policy query and respond prior to making any reservations. The terminating gatekeeper would then either respond to the location request to accept the call or to deny or reject the call, depending upon the response of the policy system.

FIG. 2 shows an embodiment of a method to query a policy system from an ASAP network. At 30, a call request is received at a terminating gatekeeper, which may be a SIP proxy or an H.323 gatekeeper. The gatekeeper queries the policy system to determine if the call is within policy at 34. If the call is within policy at 34, the terminating H.323 gatekeeper then accepts the call and transmits the accept message at 36a with the identified gateway upon which the call is to be terminated for H.323. For SIP, a message is sent to the gateway at 36b.

Returning to the example of FIG. 1, the originating gatekeeper 101 transmits a call request. In most cases, this call request will be a 'directed' request to a specific network, more than likely the lowest-cost routing option. In other examples, specific to H.323 gatekeepers, the request may be a broadcast location request, sent to several different gatekeepers seeking a terminating network. This last example can cause further problems if it is not accepted or rejected in a manner that allows the originating network to receive the rejection and avoid multiple reservations for the same call in H.323. However, for purpose of this discussion a directed location request will be assumed between the originating gatekeeper 101 and the terminating gatekeeper 121.

The terminating gatekeeper 121 will then query the policy system 20 and determine if the call is within policy. Assuming that the call is within policy, the terminating gatekeeper 121 then sends an acceptance message to the originating gatekeeper 101, including in the message the address of the gateway upon which the call should be terminated, in this example gateway 122. The originating gatekeeper then hands the call control over to the originating gateway 102 and it connects with the terminating gateway 122 to handle the call setup and routing for H.323. For SIP, the terminating proxy returns the accept or reject message and the originating proxy determines the next hop or hops.

If the terminating gatekeeper's query to the policy system indicates that the call is outside the policy, as shown at 38 in FIG. 2, the message transmitting from the terminating gatekeeper 121 to the originating gatekeeper 101 rejects the call. The originating gatekeeper 101 is then able to query the next most costly routing option, which was assumed to be terminating network 16 for this example. If the routing is not based upon the lowest-cost option, the originating gatekeeper may query other networks, inside or outside those governed by the policy system 20, or it may redirect a call to a TDM switch, etc.

Application of the invention avoids the routing loop discussed earlier. In addition, in the case of a broadcast LRQ, the call reject messages transmitted by the terminating gatekeepers avoid causing multiple reservations to be made for one call. This increases network efficiency, as resources are not committed to a call that will not terminate on those resources.

FIG. 3 shows a block diagram of a network device capable of performing the functions of the terminating gatekeeper, such as a SIP proxy, or a H.323 gatekeeper. The device 40 has an interface 42 through which it receives call requests, such as a directed call request or location request, or a broadcast LRQ. The processor 44 is operable to query the policy system to determine if the system can accept the call under the policy constraints. The device has a second interface 46, which may be a physically separate interface from the interface 42, or it may be the same physical interface but under different control to allow the device to transmit the policy query to the policy system. This will generally be true for situations in which originating gatekeepers of any type are performing the policy queries.

The policy system will use that information in its determination of whether the call is within policy. The processor will then receive the response from the policy system and generate the appropriate response. Again, the interaction with the policy system is shown as being through an interface 46 that is separate from interface 42, but they may actually be the same physical interface under the control of different processes. The network device, upon receiving the accept message, will send either a reservation, for H.323, or will send a request to a database to determine the next hop for the call, for SIP.

The methods of the invention may also be implemented in software code contained on an article of machine-readable media. The article contains the code, that when executed, cause the machine to perform the methods of the invention. The machine may be any network device, such as an H.323 gatekeeper, a SIP proxy, etc.

In general, the method includes the processes of receiving a call request, querying the policy system and then accepting or rejecting a call based upon the response of the policy system. The call request may be an incoming call request received at a terminating gatekeeper such as a SIP proxy or a H.323 gatekeeper, or a broadcast location request received by a terminating H.323 gatekeeper. In any case, the query to the policy system allows the VoIP gatekeeper to include policy information in the determination of call routing at a level that avoids routing loops.

Thus, although there has been described to this point a particular embodiment for a method and apparatus for querying a policy system, it is not intended that such specific references be considered as limitations upon the scope of this invention except in-so-far as set forth in the following claims.

What is claimed is:

1. A method of querying a policy system from any service any port (ASAP) ASAP network, the method comprising:
   receiving a call request associated with a call through the ASAP network;
   querying a policy system to determine if a first terminating gateway bridging the ASAP network and a second network may accept the call through the ASAP network and the second network before reserving any resources for the call;
   if the first terminating gateway may accept the call, transmitting an address of the first terminating gateway upon which to terminate the call; and
   if the first terminating gateway may not accept the call, determining if a subsequent terminating gateway bridging the ASAP network and a third network may accept the call through the ASAP network and the third networks before reserving resources for the call; if the subsequent terminating gateway may accept the call, transmitting an address of the subsequent terminating gateway upon which to terminate the call; and if no subsequent terminating gateway may accept the call, rejecting the call request.

2. The method of claim 1, wherein querying the policy system further comprises sending a remote authentication dial-in user service policy query access request.

3. The method of claim 1, wherein querying the policy system further comprises sending a gatekeeper transaction message protocol request.

4. The method of claim 1, wherein the call request is a location request.

5. The method of claim 1, wherein
   receiving the call request further comprises receiving a broadcast location request that was broadcast to a plurality of gatekeepers; and
   further comprising transmitting a message from each gatekeeper receiving the broadcast location request indicating that the gatekeeper may not accept the call if acceptance of the call is rejected in response to a policy system for the gatekeeper.

6. A network device, comprising:
   an interface to allow reception of a call request associated with a call; and
   a processor to:
   query a policy system to determine if a first terminating gateway may accept the call through a packet network before reserving any resources for the call;
   transmit an address of the first terminating gateway upon which to terminate the call if the first gateway may accept the call; and
   determine if a subsequent terminating gateway may accept the call through the packet network before reserving resources for the call if the first gateway may not accept the call; wherein the processor is further to transmit an address of the subsequent terminating gateway upon which the call is to be terminated if the subsequent terminating gateway may accept the call; and wherein the processor is further to reject the call request, if no subsequent terminating gateway may accept the call.

7. The network device of claim 6, wherein the network control device further comprises a session initiation protocol proxy.

8. The network device of claim 6, wherein the query further comprises a remote authentication dial in user service policy query access request.

9. The network device of claim 6, wherein the network control device further comprises an H.323 gatekeeper.

10. The network device of claim 9, wherein the query further comprises a gatekeeper transaction message protocol request.

11. An article of machine-readable code stored on a machine-readable medium that when executed, causes the machine to:

receive an incoming call request associated with a call through a first network;

query a policy system to determine if a first gateway bridging the first network and a second network may accept the call through the first and second networks before reserving any resources for the call;

if the first gateway may accept the call, transmit an address of the first gateway upon which to terminate the call; and if the first gateway may not accept the call, determine if a subsequent gateway bridging the first network and a third network may accept the call through the first and third networks before reserving resources for the call; wherein the code further causes the machine to transmit an address of the subsequent gateway upon which the call is to be terminated if the subsequent gateway may accept the call; and wherein the code further causes the machine to reject the call request if no subsequent gateway may accept the call.

12. The article of claim 11, wherein the machine is a session initiation protocol proxy.

13. The article of claim 11, wherein the machine is a H.323 gatekeeper.

14. A network device, comprising:

a means for allowing reception of a call request associated with a call;

a means for querying a policy system to determine if a first terminating gateway may accept the call before reserving any resources for the call;

means for transmitting an address of the first terminating gateway upon which to terminate the call if the first gateway may accept the call; and means for determining if a subsequent gateway that is distinct from the first terminating gateway may accept the call before reserving resources for the call if the first gateway may not accept the call; means for transmitting an address of the subsequent terminating gateway upon which to terminate the call, if the subsequent terminating gateway may accept the call; and means for rejecting the call request, if no subsequent terminating gateway may accept the call.

15. The network device of claim 14, wherein the network device further comprises a session initiation protocol proxy.

16. The network device of claim 14, wherein the query further comprises a remote authentication dial in user service policy query access request.

17. The network device of claim 14, wherein the network device further comprises an H.323 gatekeeper.

18. The network device of claim 14, wherein the query further comprises a location request.

19. The network device of claim 14, wherein the query further comprises a broadcast location request.

20. A method of querying a policy system, the method comprising:

receiving a call request associated with a call, including receiving a broadcast location request that was broadcast to a plurality of gatekeepers;

querying a policy system to determine if a first terminating gateway may accept the call before reserving any resources for the call;

transmitting a message from each gatekeeper receiving the broadcast location request indicating that the gatekeeper may not accept the call if acceptance of the call is rejected in response to a policy system for the gatekeeper;

if the first terminating gateway may accept the call, transmitting an address of the first gateway upon which to terminate the call; and if the first terminating gateway may not accept the call, determining if a subsequent gateway may accept the call before reserving resources for the call; if the subsequent terminating gateway may accept the call, transmitting an address of the subsequent terminating gateway upon which to terminate the call; and if no subsequent terminating gateway may accept the call, rejecting the call request.

* * * * *